(12) United States Patent
Ben-Yair

(10) Patent No.: US 12,197,588 B2
(45) Date of Patent: Jan. 14, 2025

(54) METHOD AND SYSTEM FOR PATCHING WEBSITES RUNNING IN A .NET FRAMEWORK ENVIRONMENT

(71) Applicant: HCL Technologies Limited, New Delhi (IN)

(72) Inventor: Gal Ben-Yair, Givaat Shmuel (IL)

(73) Assignee: HCL Technologies Limited, New Delhi (IN)

( * ) Notice: Subject to any disclaimer, the term of this patent is extended or adjusted under 35 U.S.C. 154(b) by 209 days.

(21) Appl. No.: 17/941,048

(22) Filed: Sep. 9, 2022

(65) Prior Publication Data

US 2024/0086547 A1    Mar. 14, 2024

(51) Int. Cl.
*G06F 11/00* (2006.01)
*G06F 8/65* (2018.01)
*G06F 9/54* (2006.01)
*G06F 21/57* (2013.01)

(52) U.S. Cl.
CPC ............ *G06F 21/577* (2013.01); *G06F 8/65* (2013.01); *G06F 9/542* (2013.01); *G06F 9/547* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,718,535 B1 * | 4/2004 | Underwood | G06F 9/451 717/101 |
| 8,578,487 B2 | 11/2013 | Soeder | |
| 9,712,486 B2 * | 7/2017 | Johnson | H04W 12/35 |
| 9,934,211 B2 | 4/2018 | Jennings | |
| 10,635,415 B2 | 4/2020 | Soeder | |
| 2007/0208786 A1 | 9/2007 | Kim | |
| 2009/0259999 A1 | 10/2009 | Srinivasan | |
| 2014/0282431 A1 * | 9/2014 | Delio, Jr. | G06F 11/3093 717/130 |
| 2019/0243976 A1 * | 8/2019 | Kuskov | G06F 21/51 |
| 2021/0073374 A1 * | 3/2021 | Mookken | G06F 21/54 |

FOREIGN PATENT DOCUMENTS

| | | | |
|---|---|---|---|
| CN | 104516745 A | * | 4/2015 |
| RU | 2520344 C2 | | 6/2014 |
| WO | 2015178895 A1 | | 11/2015 |

* cited by examiner

*Primary Examiner* — Christopher B Robinson
(74) *Attorney, Agent, or Firm* — Kendal M. Sheets

(57) ABSTRACT

The invention relates to method and system for patching websites running in a .NET framework environment. The method includes initiating second domain when website hosted on web-server is loaded for first-time. The website includes set of .NET modules, and one or more of the set of .NET modules are of interest. The method further includes creating patched method corresponding to each of the one or more of the set of .NET modules in the second domain by inserting preconfigured tracking code that calls the .NET module in the website via reflection. The method further includes calling, in real-time, the patched method in the second domain upon encountering the corresponding .NET module; monitoring, in real-time, behaviour of the patched method in the second domain; generating notification when the website is unloaded. The second domain is updated with information corresponding to unavailability of the unloaded website upon generating the notification.

15 Claims, 5 Drawing Sheets

METHOD AND SYSTEM FOR PATCHING WEBSITES RUNNING IN A .NET FRAMEWORK ENVIRONMENT

TECHNICAL FIELD

Generally, the invention relates to application security testing. More specifically, the invention relates to a method and system for patching websites running in a .NET framework environment.

BACKGROUND

With an exponential increase in accessibility of internet resources globally, web applications across the worldwide web are encountering an ever-increasing traffic. Traditionally, web applications are debugged and break points are inserted into specific locations of the source code to monitor or track data flow in the web applications. However, such methods are not efficient as they may severely affect user experience.

When web sites run in a .NET web server (such as, Internet Information Services (IIS) or IIS express), they are often destroyed and recreated in runtime, as defined by the configuration of the web server. Further, it may be impossible to un-patch a patched method. Therefore, when a web site is created, patched and destroyed, then calling the patched methods may attempt to call a code that no longer exists in memory. As a result, the web server may fail or crash. This makes direct patching of methods in a web environment unfeasible.

Therefore, there is a requirement in the present state of art to develop a method and a system that provides feasibility in patching websites running in a .NET framework environment and tracking data in the .NET applications.

SUMMARY

In one embodiment, a method for patching websites running in a .NET framework environment is disclosed. The method may include initiating a second domain when a website hosted on a web-server is loaded for a first-time. The website may include a set of .NET modules, and one or more of the set of .NET modules may be of interest. The method may further include creating a patched method corresponding to each of the one or more of the set of .NET modules in the second domain. Further, creating the patched method for a .NET module may include inserting a preconfigured tracking code that calls the .NET module in the website via reflection The method may further include calling, in run-time, the patched method in the second domain upon encountering the corresponding .NET module. The method may further include monitoring, in real-time, a behaviour of the patched method in the second domain. The method may further include generating a notification when the website is unloaded. The notification may be provided to the monitoring server via standard notification mechanisms. Further, generating the notification may include updating the second domain with information corresponding to unavailability of the unloaded website upon generating the notification in the second domain.

In another embodiment, a system for patching websites running in a .NET framework environment is disclosed. The system may include a processor and a memory communicatively coupled to the processor to initiate a second domain when a website hosted on a web-server is loaded for a first-time. The website may include a set of .NET modules, and one or more of the set of .NET modules may be of interest. The processor-executable instructions, on execution, may further cause the processor to create a patched method corresponding to each of the one or more of the set of .NET modules in the second domain. Further, creating the patched method for a .NET module may include inserting a preconfigured tracking code that calls the .NET module in the website via reflection. The processor-executable instructions, on execution, may further cause the processor to call, in run-time, the patched method in the second domain upon encountering the corresponding .NET module. The processor-executable instructions, on execution, may further cause the processor to monitor, in real-time, a behaviour of the patched method in the second domain. The processor-executable instructions, on execution, may further cause the processor to generate a notification when the website is unloaded. The notification may be provided to the monitoring server via standard notification mechanisms. Further, generating the notification may include updating the second domain with information corresponding to unavailability of the unloaded website upon generating the notification in the second domain.

In yet another embodiment, a non-transitory computer-readable medium storing computer-executable instruction for patching websites running in a .NET framework environment is disclosed. The stored instructions, when executed by a processor, may cause the processor to perform operations including initiating a second domain when a website hosted on a web-server is loaded for a first-time. The website may include a set of .NET modules, and one or more of the set of .NET modules may be of interest. The operations may further include creating a patched method corresponding to each of the one or more of the set of .NET modules in the second domain. Further, creating the patched method for a .NET module may include inserting a preconfigured tracking code that calls the .NET module in the website via reflection. The operations may further include calling, in run-time, the patched method in the second domain upon encountering the corresponding .NET module. The operations may further include monitoring, in real-time, a behaviour of the patched method in the second domain. The operations may further include generating a notification when the website is unloaded. The notification may be provided to the monitoring server via standard notification mechanisms. Further, generating the notification may include updating the second domain with information corresponding to unavailability of the unloaded website upon generating the notification in the second domain.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
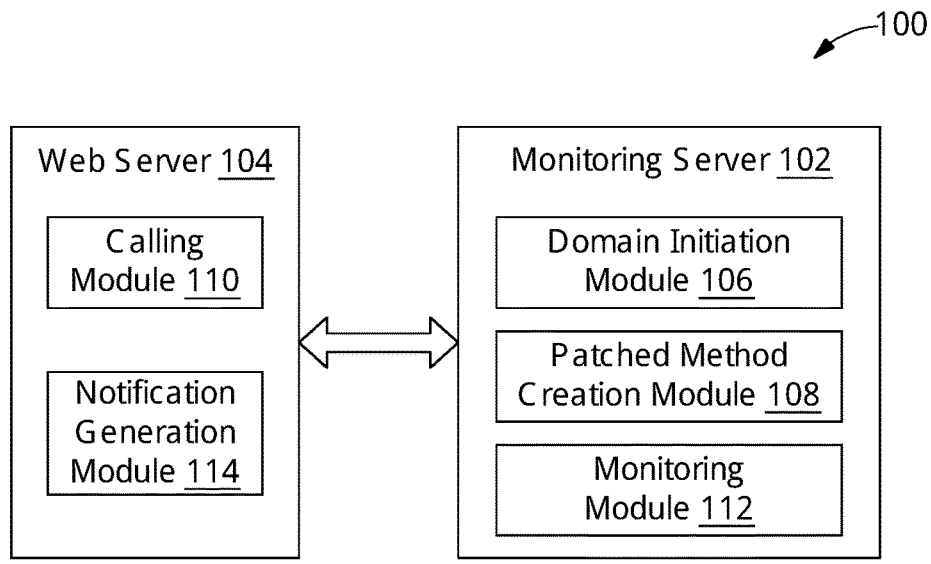
FIG. 1 illustrates a block diagram of a system for patching websites running in a .NET framework, in accordance with some embodiments of the present disclosure.

Referring now to FIG. 1, a system 100 for patching websites running in a .NET framework is illustrated, in accordance with some embodiments of the present disclosure. In some embodiments, the system 100 may include a monitoring server 102 and a web server 104 communicatively coupled to each other. The monitoring server 102 may further include a domain initiation module 106, a patched method creation module 108, and a monitoring module 112. The web server 104 may further include a calling module 110 and a notification generation module 114. Further, the system 100 may also include a data store (not shown in FIG. 1) in order to store intermediate results generated by the modules 106-114. In an embodiment, the monitoring server 102 may correspond to an Interactive Application Security Testing (IAST) domain and the web server 104 may correspond to a web domain. It should be noted that the web server 104 may host a website that may be accessed by a plurality of users in real-time. The monitoring server 102, through the various techniques disclosed in the present disclosure, may monitor behaviour of one or more components of the website without affecting experience of the plurality of users.

The domain initiation module 106 may be configured to initiate a second domain (i.e., the IAST domain). The second domain may be initiated when the website hosted on the web server 104 is loaded for a first-time. It may be noted that the website may have a set of .NET modules. The one or more modules from the set of .NET modules may be the modules of interest. The domain initiation module 106 may be communicatively coupled to the patched method creation module 108.

The patched method creation module 108 may be configured to create a patched method corresponding to each of the one or more of the set of .NET modules in the second domain. In some embodiments, a preconfigured tracking code may be inserted in order to create the patched method. The preconfigured tracking code may call the .NET module of interest in the website via reflection. This may be further explained in conjunction with FIGS. 2-5. In an embodiment, the preconfigured tracking code may include a first code and a second code. The first code may be inserted at beginning of the patched method and the second code may be inserted at end of the patched method. In such an embodiment, the first code and the second code may be used as reference points in the Further, the patched method creation module 108 may also include a modification module (not shown in FIG. 1) for modifying a Common Intermediate Language (CIL)/Intermediate Language (IL) code corresponding to the patched method in runtime. In some embodiments, the patched method creation module 108 of the monitoring server 102 may be communicatively coupled to the calling module 110 of the web server 104.

The calling module 110 may be configured to call the patched method in the second domain. The patched method may be called by the calling module 110 upon encountering the corresponding .NET module. Further the calling module 110 may be operatively coupled to the monitoring module 112. The monitoring module 112 may be configured to monitor a behaviour of the patched method in the second domain. The monitoring module 112 may be communicatively coupled to the notification generation module 114 to transfer the monitored data.

The notification generation module 114 may be configured to generate a notification when the website is unloaded. The notification may be provided to the monitoring server 102 via standard notification mechanisms. Further, in some embodiments, the second domain may be updated with information corresponding to unavailability of the unloaded website upon generating the notification in the second domain. Additionally, in some embodiments, operation of the calling of the patched method of the unloaded website in a first domain (i.e., the web domain) to the second domain may be terminated in the system 100. Further, the web server 104 may also include an identification module (not shown in FIG. 1) for identifying the one or more of the set of .NET modules in a source code of the website in the first domain.

Figure 2:
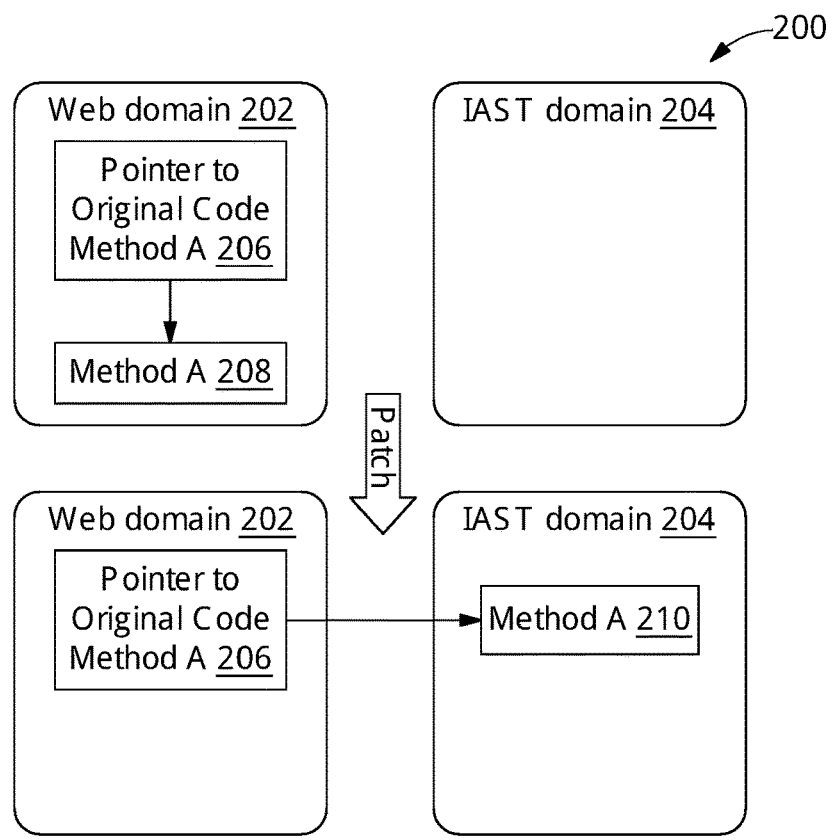
FIG. 2 illustrates a block diagram of a system for patching of all required methods in the new domain, in accordance with some embodiments of the present disclosure.

Referring now to FIG. 2, a system 200 for patching of all required methods in the new domain is illustrated, in accordance with some embodiments of the present disclosure.

FIG. 2 is explained in conjunction with FIG. 1. The system 200 includes a web domain 202 and an Interactive Application Security Testing (IAST) domain 204. In an embodiment, a web server (for example, the web server 104) may include the web domain 202 hosting a website. The website may include a set of .NET modules. It should be noted that one or more of the set of .NET modules may be of interest for monitoring or tracking for various applications such as, but not limited to, security testing, debugging, etc. By way of an example, the IAST domain 204 may be initiated on a monitoring server (for example, the monitoring server 102) when the website hosted by the web server is loaded for the first time.

The web domain 202 may include a plurality of methods (For example, a method A 208) and a pointer (for example, a pointer 208) to each of the plurality of methods. As illustrated in FIG. 2, the method A 208 may have corresponding pointer to original code method A 206. As will be appreciated, a pointer is a variable whose value is an address of a second variable i.e., direct address of memory location of the second variable. Further, a patched method A 210 may be created corresponding to each of the one or more of the .NET modules in the IAST domain 204. The patched method 210 may be created by calling the method A 208 via reflection. It should be noted that the patched method may be created by inserting a preconfigured tracking code. In an embodiment, the preconfigured tracking code may include a first code and a second code. The first code may be inserted before the reflection of the method A 208 and the second code may be inserted after the reflection of the method A 208 in the IAST domain 204. This is further explained in detail in conjunction with FIG. 3.

Further, the behaviour of the patched method A 210 may be monitored via the preconfigured tracking code in the IAST domain 204. Thus, creation of the patched method A 210 may allow monitoring of the method A 208 in real-time without shutting down the website on the web server.

Figure 3:
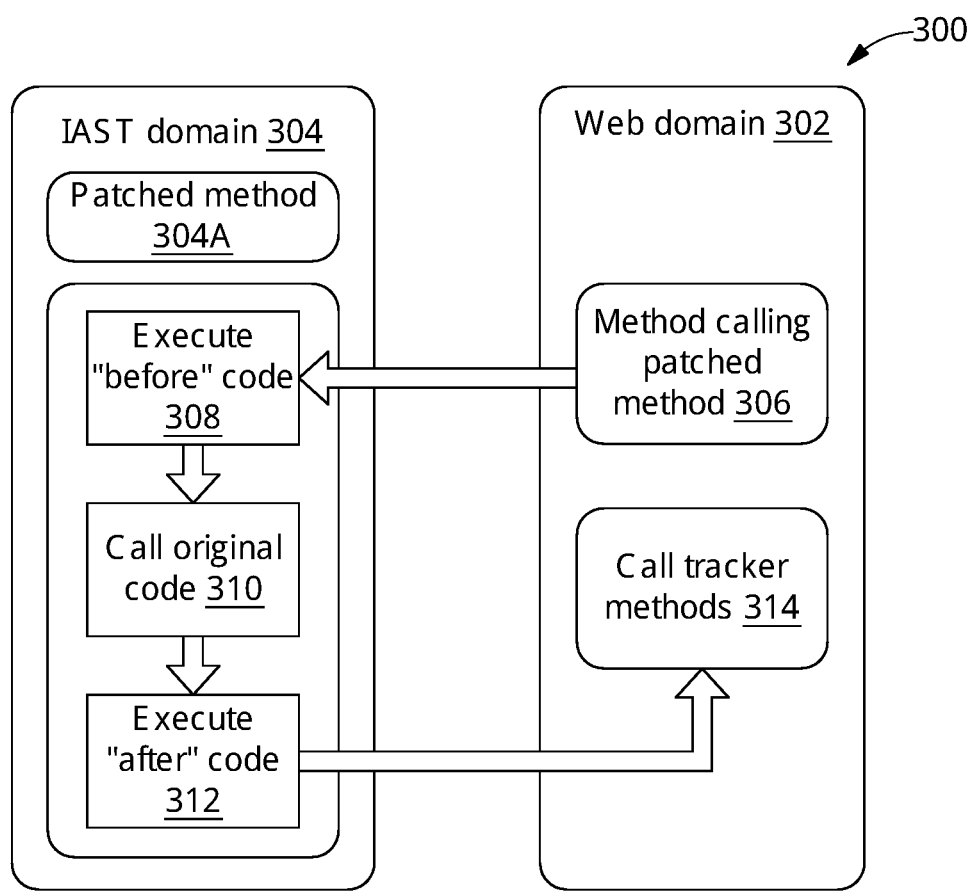
FIG. 3 illustrates a block diagram of a system for calling methods of interest from a web domain to an IAST domain via a reflection, in accordance with some embodiments of the present disclosure.

Referring now to FIG. 3, a system 300 for calling methods of interest from a web domain 302 to an IAST domain 304 via a reflection is illustrated, in accordance with some embodiments of the present disclosure. FIG. 3 is explained in conjunction with FIG. 1 and FIG. 2. The system 300 may include a web domain 302 (same as the web domain 202) and an IAST domain 304 (same as the IAST domain 204). The IAST domain 304 may include a patched method 304A (same as the patched method A 210) corresponding to a method of interest. It should be noted that the method of interest is one of the set of .NET modules in the website. Further, to create the patched method 304a, a preconfigured tracking code may be inserted in the IAST domain 304. The preconfigured tracking code may include a first code and a second code. In an embodiment, the first code may be inserted at the beginning of the code corresponding to the patched method 304a and the second code may be inserted at the end of the patched method 304a.

Various steps may be performed in system 300 to call methods of interest from the web domain via reflection to the IAST domain. At step 306, the patched method may be called to the IAST domain via reflection. At step 308, the 'before code' (i.e., the first code of the preconfigured tracking code) may be executed. At step 310, original code corresponding to the method of interest may be called. At step 312, the 'after code' (i.e., the second code of the preconfigured tracking code); may be executed. Thereafter, at step 314, the tracker methods (i.e., the preconfigured tracking code) of the IAST domain 304 may be called. The tracker methods may facilitate monitoring of the behaviour of the method of interest of the website in real-time in the IAST domain 304.

It should be noted that the system 300 may be implemented in programmable hardware devices such as programmable gate arrays, programmable array logic, programmable logic devices, or the like. Alternatively, the system 300 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for patching websites running in a .NET framework environment. For example, the system 300 may patch websites running in a .NET framework environment, by the process discussed herein. In particular, as will be appreciated by those of ordinary skill in the art, control logic and/or automated routines for performing the techniques and steps described herein may be implemented by the system 300 either by hardware, software, or combinations of hardware and software. For example, suitable code may be accessed and executed by the one or more processors on the system 300 to perform some or all of the techniques described herein. Similarly, application specific integrated circuits (ASICs) configured to perform some or all the processes described herein may be included in the one or more processors on the system 300.

Figure 4:
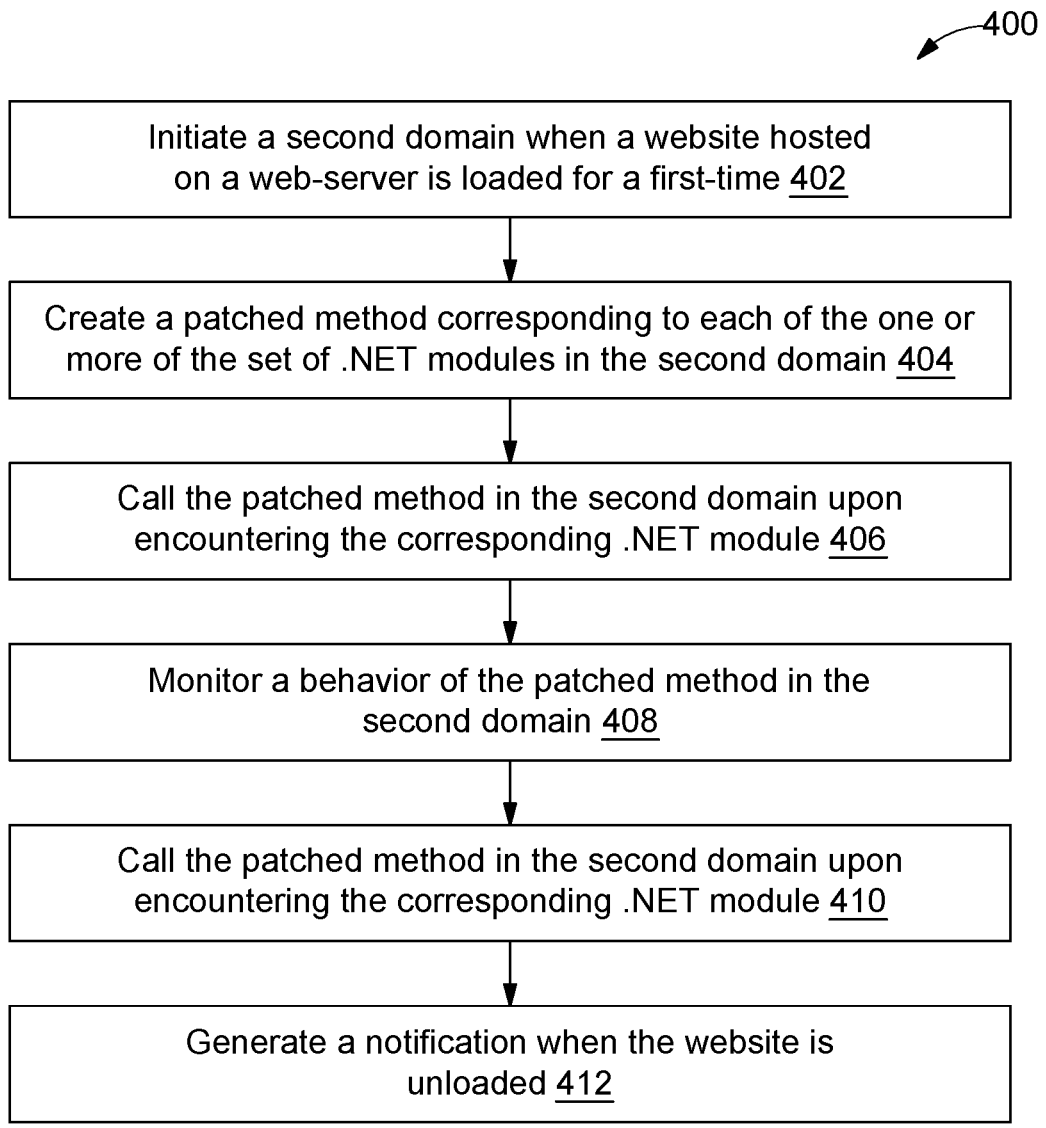
FIG. 4 illustrates a flowchart of a method of patching websites running in a .NET framework environment, in accordance with some embodiments of the present disclosure.

Referring now to FIG. 4, an exemplary process 400 for patching websites running in a .NET framework environment is depicted via a flow diagram, in accordance with some embodiments of the present disclosure. Each step of the process 400 may be performed by a monitoring server (for example, the monitoring server 102) and a web server (for example, the web server 104). FIG. 4 is explained in conjunction with FIGS. 1-3.

At step 402, a second domain (e.g., an IAST domain) may be initiated when a website hosted on the web-server is loaded for a first-time by the domain initiation module 106 of the monitoring server 102. The website may include a set of .NET modules. Further, it should be noted that one or more of the set of .NET modules are the modules of interest. In some embodiments, the one or more of the set of .NET modules in a source code of the website in the first domain may be identified.

At step 404, a patched method corresponding to each of the one or more of the set of .NET modules may be created by the patched method creation module 108 of the monitoring server 102. It should be noted that the patched method may be created in the second domain. In some embodiments, in order to create the patched method for a .NET module, a preconfigured tracking code may be inserted. The preconfigured tracking code may include a first code and a second code. The first code may be inserted at beginning of the patched method and the second code may be inserted at end of the patched method. The preconfigured tracking code may call the .NET module in the website via reflection. In some embodiments, a Common Intermediate Language (CIL)/Intermediate Language (IL) code corresponding to the patched method may be modified in runtime.

At step 406, the patched method in the second domain may be called in run time by the calling module 110 of the web-server 104. It should be noted that calling may be done upon encountering the corresponding .NET module. Thereafter, at step 408, a behaviour of the patched method may be monitored in the second domain by the monitoring module 112 of the monitoring server 102.

At step 410, a notification may be generated, by the notification generation module 114 of the web server 104, when the website is unloaded. It should be noted that standard notification mechanisms may be used for providing the notification to the monitoring server 102. At step 412, the web-server 104 may generate a notification when the website is unloaded. The notification may be provided to the monitoring server 102 via standard notification mechanisms. Further, in some embodiments, to generate the notification, the second domain may be updated with information corresponding to unavailability of the unloaded website upon generating the notification in the second domain. In some embodiments, operation of the calling of the patched method of the unloaded website in the first domain to the second domain may be terminated.

Figure 5:
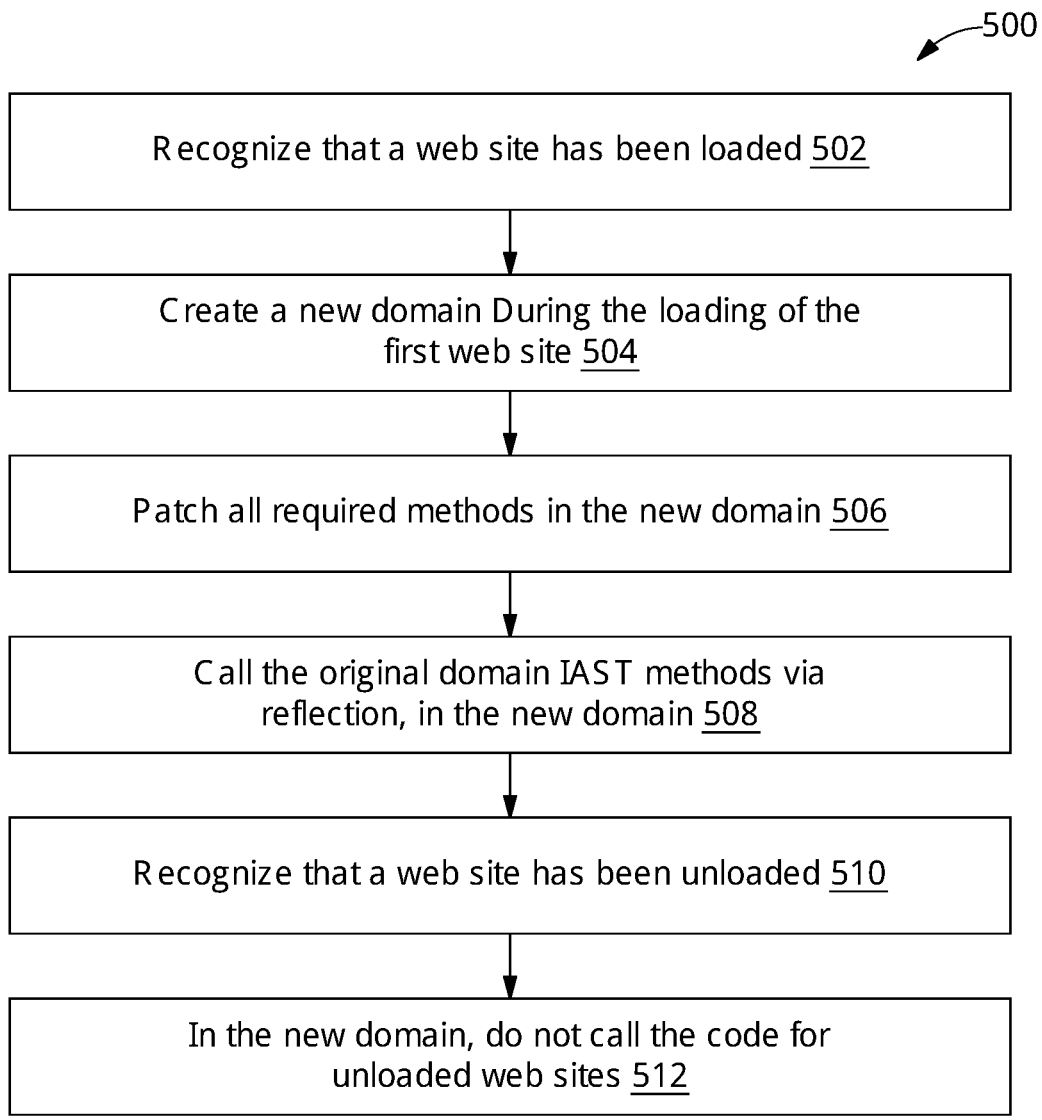
FIG. 5 illustrates, a flowchart of a detailed method of patching websites running in a .NET framework environment, in accordance with some embodiments of the present disclosure.

Referring now to FIG. 5, a detailed method 500 of patching websites running in a .NET framework environment is depicted via a flow chart, in accordance with some embodiments of the present disclosure. FIG. 5 is explained in conjunction with FIGS. 1-4.

At step 502, loading of the website may be recognized, by the domain initiation module 106 of the monitoring server 102. The website may be hosted on a web domain (for example, the web server 104). In the .NET framework, the recognition of loading of the website may be executed using one or more of a set of .NET modules. The one or more of the set of .NET modules may be easily injected into websites and may run a code as required.

At step 504, a new domain (for example, the monitoring server 102) may be created during the loading of the first website, by the domain initiation module 106 of the monitoring server 102. The new domain may be created using a dedicated code in case a web site is launched for the first time. In the new domain, IAST may run the code to patch methods.

At step 506, all required methods may be patched in the new domain, by the patched method creation module 108 of the monitoring server 102. In the patched methods, code that calls the IAST code loaded in the web site domain may be inserted via reflection. This may allow the code to jump from the IAST domain to the web domain. Further, at step 508, original domain IAST methods may be called in the new domain via reflection, by the calling module 110 of the web server 104.

At step 510, unloading of the website may be recognized, by the monitoring module 112 of the monitoring server 102. When a website is unloaded by the web server, the new domain may be notified via standard notification mechanisms (e.g., by the notification generation module 114). Further, in some embodiments, the new domain (i.e., the IAST domain) may be updated when the website is no longer available.

At step 512, operation of calling the code for unloaded website may be terminated in the new domain. It should be noted that when a patched method is called either by a new website or Internet Information Services (IIS) itself, the unloaded method may not be called by the reflection. With regards to this, the code that no longer exists may not be called.

Figure 6:
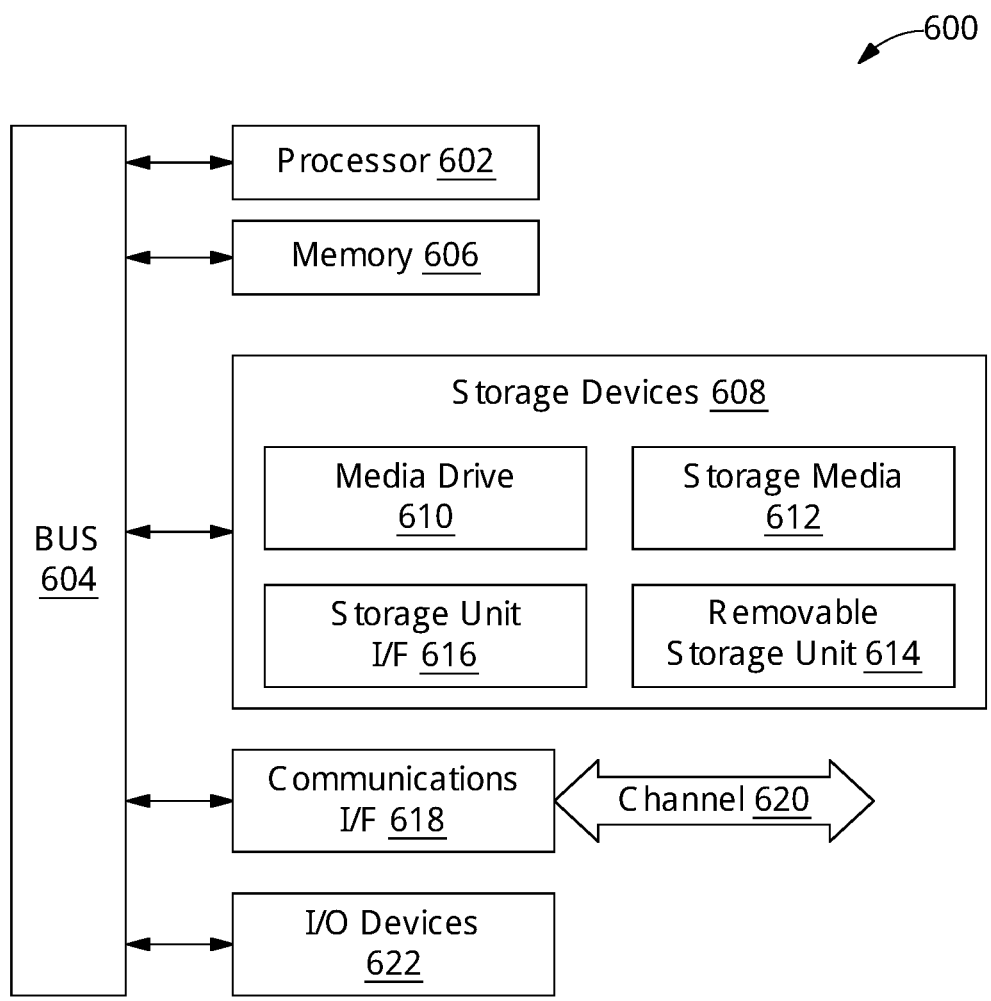
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, an exemplary computing system 600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment. The computing system 600 may include one or more processors, such as a processor 602 that may be implemented using a general or special purpose processing engine such as, for example, a microprocessor, microcontroller or other control logic. In this example, the processor 602 is connected to a bus 604 or other communication medium. In some embodiments, the processor 602 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 606 (main memory), for example, Random Access Memory (RAM) or other dynamic memory, for storing information and instructions to be executed by the processor 602. The memory 606 also may be used for storing temporary variables or other intermediate information during execution of instructions to be executed by the processor 602. The computing system 600 may likewise include a read only memory ("ROM") or other static storage device coupled to bus 602 for storing static information and instructions for the processor 602.

The computing system 600 may also include a storage device 608, which may include, for example, a media drives 610 and a removable storage interface. The media drive 610 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 612 may include, for example, a hard disk, magnetic tape, flash drive, or other fixed or removable medium that is read by and written to by the media drive 610. As these examples illustrate, the storage media 612 may include a computer-readable storage medium having stored there in particular computer software or data.

In alternative embodiments, the storage devices 608 may include other similar instrumentalities for allowing computer programs or other instructions or data to be loaded into the computing system 600. Such instrumentalities may include, for example, a removable storage unit 614 and a storage unit interface 616, such as a program cartridge and cartridge interface, a removable memory (for example, a flash memory or other removable memory module) and memory slot, and other removable storage units and interfaces that allow software and data to be transferred from the removable storage unit 614 to the computing system 600.

The computing system 600 may also include a communications interface 618. The communications interface 618 may be used to allow software and data to be transferred between the computing system 600 and external devices. Examples of the communications interface 618 may include a network interface (such as an Ethernet or other NIC card), a communications port (such as for example, a USB port, a micro USB port), Near field Communication (NFC), etc. Software and data transferred via the communications interface 618 are in the form of signals which may be electronic, electromagnetic, optical, or other signals capable of being received by the communications interface 618. These signals are provided to the communications interface 618 via a channel 610. The channel 620 may carry signals and may be implemented using a wireless medium, wire or cable, fiber optics, or other communications medium. Some examples of the channel 620 may include a phone line, a cellular phone link, an RF link, a Bluetooth link, a network interface, a local or wide area network, and other communications channels.

The computing system 600 may further include Input/Output (I/O) devices 622. Examples may include, but are not limited to a display, keypad, microphone, audio speakers, vibrating motor, LED lights, etc. The I/O devices 622 may receive input from a user and also display an output of the computation performed by the processor 602. In this document, the terms "computer program product" and "computer-readable medium" may be used generally to refer to media such as, for example, the memory 612, the storage devices 608, the removable storage unit 614, or signal(s) on the channel 620. These and other forms of computer-readable media may be involved in providing one or more sequences of one or more instructions to the processor 602 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 614, the media drive 610 or the communications interface 618. The control logic (in this example, software instructions or computer program code), when executed by the processor 602, causes the processor 602 to perform the functions of the invention as described herein.

Thus, the present disclosure may overcome drawbacks of traditional systems discussed before. The disclosed method and system in the present disclosure may allow users to run the IAST on web applications. Further, the users may use the new method to run IAST in real-time on live web sites and applications as the performance hit is minimal. Further, the disclosure provides a significant improvement over the current methods of tracking data in the .NET applications.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for patching websites running in a .NET framework environment, the method comprising:
    initiating, by a monitoring server, a second domain when a website hosted on a web-server is loaded for first-time, wherein the website comprises a set of .NET modules, and wherein one or more of the set of .NET modules are of interest;
    creating, by the monitoring server, a patched method corresponding to each of the one or more of the set of .NET modules in the second domain, wherein creating the patched method for a .NET module comprises inserting a preconfigured tracking code that calls the .NET module in the website via reflection;
    calling, in run-time and by the web-server, the patched method in the second domain upon encountering the corresponding .NET module;
    monitoring, in real-time and by the monitoring server, a behaviour of the patched method in the second domain; and
    generating, by the web-server, a notification when the website is unloaded, wherein the notification is provided to the monitoring server via standard notification mechanisms, wherein generating the notification further comprises updating the second domain with information corresponding to unavailability of the unloaded website upon generating the notification in the second domain.

2. The method of claim 1, further comprising terminating operation of the calling of the patched method of the unloaded website in a first domain to the second domain.

3. The method of claim 1, wherein creating the patched method in the second domain comprises modifying, in runtime, a Common Intermediate Language (CIL)/Intermediate Language (IL) code corresponding to the patched method.

4. The method of claim 1, further comprising identifying the one or more of the set of .NET modules in a source code of the website in the first domain.

5. The method of claim 1, wherein the preconfigured tracking code comprises a first code and a second code, and wherein the first code is inserted at beginning of the patched method and the second code is inserted at end of the patched method.

6. A system for patching websites running in a .NET framework environment, the system comprising:
- a processor; and
- a memory communicatively coupled to the processor, wherein the memory stores processor-executable instructions, which, on execution, cause the processor to:
  - initiate a second domain when a website hosted on a web-server is loaded for first-time, wherein the website comprises a set of .NET modules, and wherein one or more of the set of .NET modules are of interest;
  - create a patched method corresponding to each of the one or more of the set of .NET modules in the second domain, wherein creating the patched method for a NET module comprises inserting a preconfigured tracking code that calls the .NET module in the website via reflection;
  - call, in run-time, the patched method in the second domain upon encountering the corresponding .NET module;
  - monitor, in real-time, a behaviour of the patched method in the second domain; and
  - generate a notification when the website is unloaded, wherein the notification is provided to the monitoring server via standard notification mechanisms, wherein generating the notification further comprises updating the second domain with information corresponding to unavailability of the unloaded website upon generating the notification in the second domain.

7. The system of claim 6, wherein the processor-executable instructions further cause the processor to terminate operation of the calling of the patched method of the unloaded website in the first domain to the second domain.

8. The system of claim 6, wherein the processor-executable instructions further cause the processor to create the patched method in the second domain by modifying, in runtime, Common Intermediate Language (CIL)/Intermediate Language (IL) code corresponding to the patched method.

9. The system of claim 6, wherein the processor-executable instructions further cause the processor to identify the one or more of the set of .NET modules in a source code of the website in the first domain.

10. The system of claim 6, wherein the tracking code comprises a first code and a second code, and wherein the first code is inserted at beginning of the patched method and the second code is inserted at end of the patched method.

11. A non-transitory computer-readable medium storing computer-executable instructions for patching websites running in a .NET framework environment, the computer-executable instructions configured for:
- initiating a second domain when a website hosted on a web-server is loaded for first-time, wherein the website comprises a set of .NET modules, and wherein one or more of the set of .NET modules are of interest;
- creating a patched method corresponding to each of the one or more of the set of .NET modules in the second domain, wherein creating the patched method for a NET module comprises inserting a preconfigured tracking code that calls the .NET module in the website via reflection;
- calling, in run-time, the patched method in the second domain upon encountering the corresponding .NET module;
- monitoring, in real-time, a behaviour of the patched method in the second domain; and
- generating a notification when the website is unloaded, wherein the notification is provided to the monitoring server via standard notification mechanisms, wherein generating the notification further comprises updating the second domain with information corresponding to unavailability of the unloaded website upon generating the notification in the second domain.

12. The non-transitory computer-readable medium of claim 11, wherein the computer-executable instructions further configured for terminating operation of the calling of the patched method of the unloaded website in the first domain to the second domain.

13. The non-transitory computer-readable medium of claim 11, wherein the computer-executable instructions further configured for creating the patched method in the second domain by modifying in runtime, Common Intermediate Language (CIL)/Intermediate Language (IL) code corresponding to the patched method.

14. The non-transitory computer-readable medium of claim 11, wherein the computer-executable instructions further configured for identifying the one or more of the set of .NET modules in a source code of the website in the first domain.

15. The non-transitory computer-readable medium of claim 14, wherein the preconfigured tracking code comprises a first code and a second code, and wherein the first code is inserted at beginning of the patched method and the second code is inserted at end of the patched method.

* * * * *